United States Patent [19]
Cronk

[11] Patent Number: 5,575,524
[45] Date of Patent: Nov. 19, 1996

[54] DISCREET MOTOR VEHICLE WINDOW SHADE

[76] Inventor: Peter J. Cronk, 919 McElwee Rd., Moorestown, N.J. 08057

[21] Appl. No.: 314,973

[22] Filed: Sep. 29, 1994

[51] Int. Cl.⁶ ........................................ B60J 1/20
[52] U.S. Cl. .................. 296/142; 296/97.8; 160/370.22
[58] Field of Search .............. 296/83, 97.4, 97.8, 296/97.9, 97.11, 140, 141, 142, 143; 160/290.1, 370.22

[56] References Cited

U.S. PATENT DOCUMENTS

| | | | |
|---|---|---|---|
| 1,684,690 | 9/1928 | Steger | 296/97.8 |
| 2,363,762 | 11/1944 | Wardan | 296/97.8 |
| 3,363,666 | 1/1968 | Hodgson et al. | 160/23.1 |
| 4,261,411 | 4/1981 | Dieterich | 160/290.1 |
| 4,570,991 | 2/1986 | Lystad | 296/97.8 |
| 4,671,558 | 6/1987 | Cline | 296/97.8 X |
| 4,758,041 | 7/1988 | Labeur | 296/97.8 X |
| 4,823,859 | 4/1989 | Park | 296/97.8 X |
| 4,913,211 | 4/1990 | Eskandry et al. | 296/97.8 |
| 4,921,299 | 5/1990 | Herrick | 296/97.8 |
| 4,932,710 | 6/1990 | Chen | 296/97.3 |
| 5,060,361 | 10/1991 | Grimes | 29/450 |
| 5,133,585 | 7/1992 | Hassan | 296/97.8 X |
| 5,284,198 | 2/1994 | Kauka | 160/70 |
| 5,344,206 | 9/1994 | Middleton | 296/97.8 |
| 5,409,284 | 4/1995 | Mahler | 296/97.8 X |

FOREIGN PATENT DOCUMENTS 686680  3/1965  Italy ...................... 296/97.8

OTHER PUBLICATIONS

BMW Trade Literature Entitled "Original BMW Accessories", (partial record), p. 16, 1995.
Solutions Catalog Entitled "Products that make life easier", p. 26, Early Summer 1995 edition, Solutions, Portland, OR.
Photocopy of packaging for Deluxe Sunscreen by Safety1st, Safety 1st Inc., Chestnut Hill, MA, 1990.
BMW Trade Literature Entitled "The New BMW 7–Series", (partial record), pp. 13 & 45, 1995.

*Primary Examiner*—Andrew C. Pike
*Attorney, Agent, or Firm*—Duane, Morris & Heckscher

[57] ABSTRACT

A combination of a window shading device and a rigid window frame of a motor vehicle windshield is provided. The windshield is supported in a rigid window frame. The combination includes a cover disposed over a portion of the rigid window frame to provide a pleasing aesthetic appearance to an interior portion of the motor vehicle. The invention includes a shade wound onto a winding core, where the shade includes one free end and one fixed end adhered to the winding core. The winding core is swively mounted between the rigid window frame and the cover. The cover provides a slotted opening, preferably carved through its surface, for receiving the free end of the shade. The shade has a surface area which can substantially cover a selected surface area of the windshield.

18 Claims, 4 Drawing Sheets

DISCREET MOTOR VEHICLE WINDOW SHADE

FIELD OF THE INVENTION

This invention relates to devices for shading the interior of motor vehicles, and especially to discreet window shades which can be secured behind covers or interior panels.

BACKGROUND OF THE INVENTION

There are very few individuals that have not experienced the inconvenience of entering into an automobile after parking the vehicle in the hot sun on a summer afternoon. Unless the vehicle is parked in the shade, the steering wheel and seating surfaces can reach intolerable temperatures. Even air conditioning may be too little and too late to avoid the onset of perspiration and discomfort.

The automobile industry has recognized this problem for some time, and has sought to minimize the adverse effects of the sun's radiant energy by providing tinted windows. This has provided only limited relief. Since tinting has the side effect of impairing the visibility through the windshield, especially during night driving, the degree to which tinting can be used to screen the vehicle's interior surfaces from the sun's rays is limited. To compensate for this limitation, mechanical shading devices have been designed to supplement or entirely replace window tinting.

One such device is a foldable cardboard window shade as suggested in U.S. Pat. No. 4,763,947. This window shade is typically stored in the trunk or rear seat of a motor vehicle and is opened by the driver and inserted between the dashboard and the windshield to block the sun's rays. Although this device is inexpensive to manufacture and provides an opaque surface for blocking sunlight, it is inconvenient to use, takes up valuable storage space in the motor vehicle, and provides an appearance which is typically inconsistent with the finish of the automobile.

In addition to foldable window shades, there are also a number of winding window shades or screens available. These shades operate substantially like a window shade used in a home—they are unwound from a winding core so that they cover an interior surface of one of the motor vehicle windows. Such shades are disclosed in Kauka, U.S. Pat. No. 5,284,198; Dieterich, U.S. Pat. No. 4,261,411; and Hodgson, U.S. Pat. No. 3,363,666. There are also a number of shades available which are applied directly to the windshield with suction cups and the like, such as the Deluxe Adjustable Sunscreen sold by Safety1st.

While such shades offer a measurable improvement in convenience over foldable cardboard shades, they also have the same tendency as cardboard shades to be inconsistent with the overall intended aesthetic appearance of the interior compartment. Automobile manufacturers have exerted much of their resources in recent years to provide a smooth flowing, unobstructed aesthetic appearance to the interior of motor vehicles. The concept of providing a rather bulky shade mounted to one of these smooth surfaces of the cabin would certainly be a setback to many of these designs.

More importantly, however, the use of bulky mechanical winding screens mounted to the window frame, or directly to the window, with hook and loop, suction cups, or mechanical fasteners, presents a safety risk. Because such devices normally block a portion of the driver's vision through the windshield, even when fully wound or closed, there may be an occasion where the driver's vision of an oncoming vehicle or pedestrian is blocked by such a device. If the driver's vision is impaired, even for a split second, the consequences could be tragic.

Additionally, during impact collisions, anything that is less than securely attached to the window frame or window glass can be detached and become a flying projectile. Unfortunately, most of the currently available mounting systems are not adequately designed to avoid the severance of the screen from its underlying supporting surface during an accident. Additionally, even if the screen is attached securely, the sharp edges that are common to many devices could present the risk of a head injury as the driver is thrown forward during an accident.

Accordingly, there is a need for a more discreet and aesthetically pleasing window screen to protect the interior compartment of motor vehicles from sunlight during storage of the vehicle outdoors in the hot sun. There is also a need for a window screen which can be secured to the motor vehicle in such a way as to avoid impairing the driver's vision or creating an unsafe condition during a collision.

SUMMARY OF THE INVENTION

This invention provides a window shade which is most suitable for use with motor vehicle windows. Such windows are typically supported in a rigid window frame having a cover disposed over a portion of the frame to provide a pleasing aesthetic appearance. This invention provides a shade wound onto a core, whereby the shade has a free end and a fixed end attached to the winding core. The core can be swivelly mounted between the window frame and the cover so as to discreetly and aesthetically hide the shade when it is not in use. The cover includes a slotted opening therein for receiving the free end of the shade, such that the shade can be unwound from its winding core through this opening.

The window shades of this invention can be used discreetly and more safely than previous designs. Since they can be mounted to a window pillar support, which is typically made of metal, they are less susceptible to becoming detached in a collision. Moreover, the preferred window shade devices of this invention can have the additional protection of the automobile's pillar interior panel which acts to contain the shade device if it ever becomes detached from the window pillar, or if its fasteners are defective. Because the shade devices of this invention are concealed, they do not detract from the driver's view of the road. Finally, these shades provide aesthetic improvements and design capabilities that are unmatched by prior shade devices. It is reasonable to assume that the cover panels which conceal the shade devices of this invention could be made of plastic, metal, wood, or composite materials, and contoured and tinted so as to blend in completely with the remaining cabin features.

In more detailed embodiments of this invention, the shade portions of these devices can be equipped with a rigid support along their free ends. The rigid support can behave as a stop mechanism for the shade so that it is not inadvertently wound into the cavity formed between the window pillar and its matching interior panel. The rigid support also helps to keep the shade in a neat, rectangular configuration as it is unwound from the winding core. This will keep the shade from bending or creasing as it is used. In another aspect of this invention, the rigid support can be configured to fit within the slotted opening in the cover or pillar interior panel. In certain embodiments, the rigid support can be constructed to color match and provide a nearly flush mount with the pillar interior panel, so as to blend in with the motor vehicle's interior. Optionally, the rigid support can be replaced with a smaller stop that could have some of these design features.

BRIEF DESCRIPTION OF THE DRAWINGS

The accompanying drawings illustrate preferred embodiments of the invention, as well as other information pertinent to the disclosure, in which.

DETAILED DESCRIPTION OF THE INVENTION

This invention provides window shades for use with motor vehicles which are exceptionally discreet and provide a measure of safety greater than currently known devices. The terms "vertical" and "horizontal", as used herein, refer to the driver's perspective, even though there may be a "Z" component, as for example in "cab-forward" designs, that will appear to flatten the vertical dimension of the windshield when viewed from the side of the vehicle. Also, as used herein, the term "motor vehicle" is intended to include vehicles containing electric, internal combustion engines, or other propulsion mechanisms which travel in the air, on water, or on land. These include automobiles, trucks, boats, and airplanes. Nearly every one of these motor vehicles has a windshield and an interior cabin which often includes a dashboard, steering mechanism, and one or more seats. One of the primary objects of this invention is to prevent the overheating of these surfaces by the sun to minimize premature degradation of the polymeric and painted surfaces, and to increase user comfort.

Figure 1:
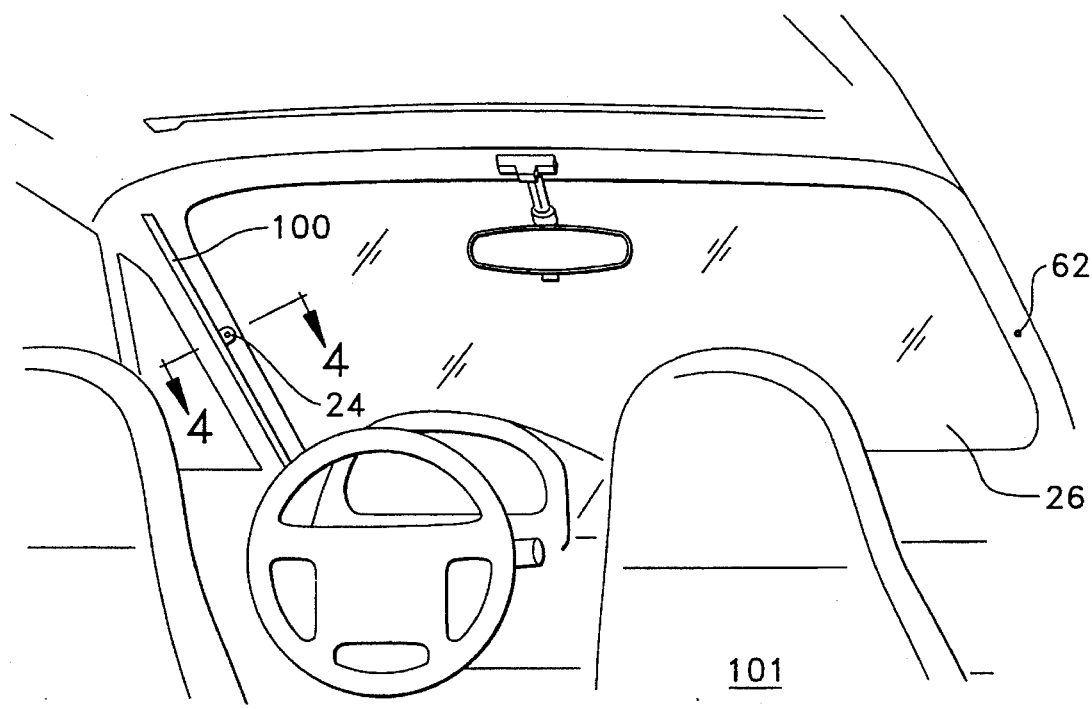
FIG. 1: is a front perspective view of a motor vehicle cabin showing the window shade device of this invention mounted to the left windshield pillar.
Figure 2:
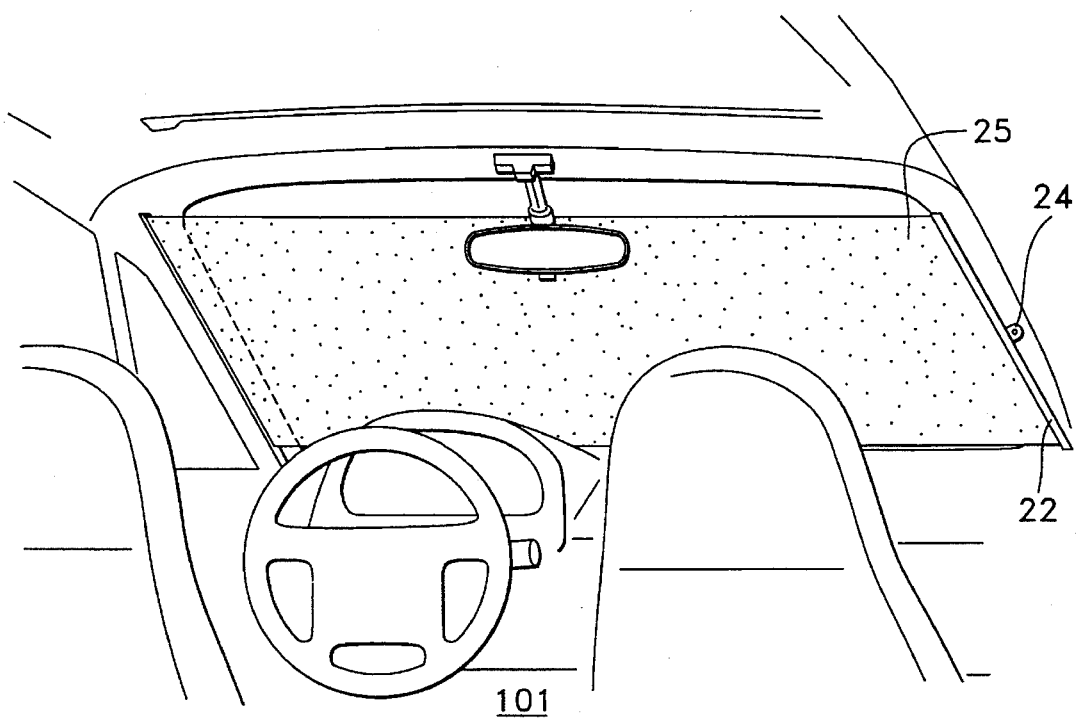
FIG. 2: is a front perspective view of the motor vehicle cabin of FIG. 1, illustrating the window shade device having been pulled to extend the shade across the windshield.

With reference to the figures, and particular to FIGS. 1 and 2, there is shown a typical motor vehicle cabin 101, having a windshield 26. A preferred window shade device 100 of this invention is mounted in the left windshield pillar for convenient access from the driver's seat. On hot summer days, the driver merely pulls the pull tab 24 and unwinds the concealed shade 25 to substantially cover the windshield 26. The pull tab can be hooked onto a latch member 62 on the right windshield pillar to secure the shade in an open position. The tension created by the winding core is all that is needed to keep this shade in place, as shown in FIG. 2.

Figure 3:
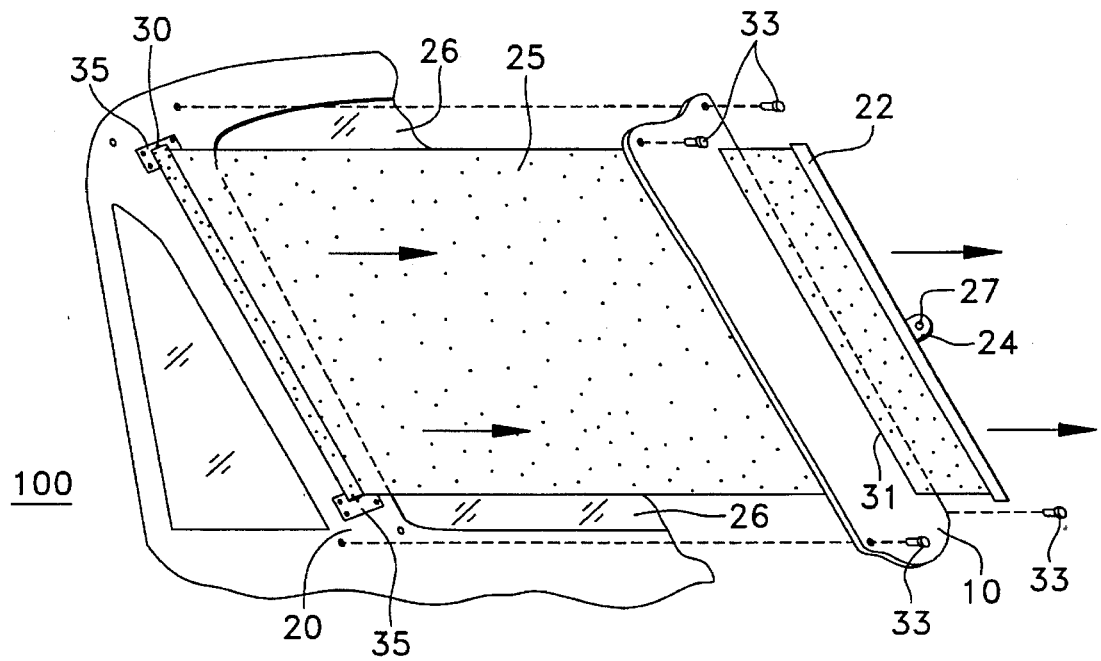
FIG. 3: is an exploded view of the left windshield pillar of the motor vehicle cabin of FIG. 1, illustrating the preferred window shade device in more detail.
Figure 4:
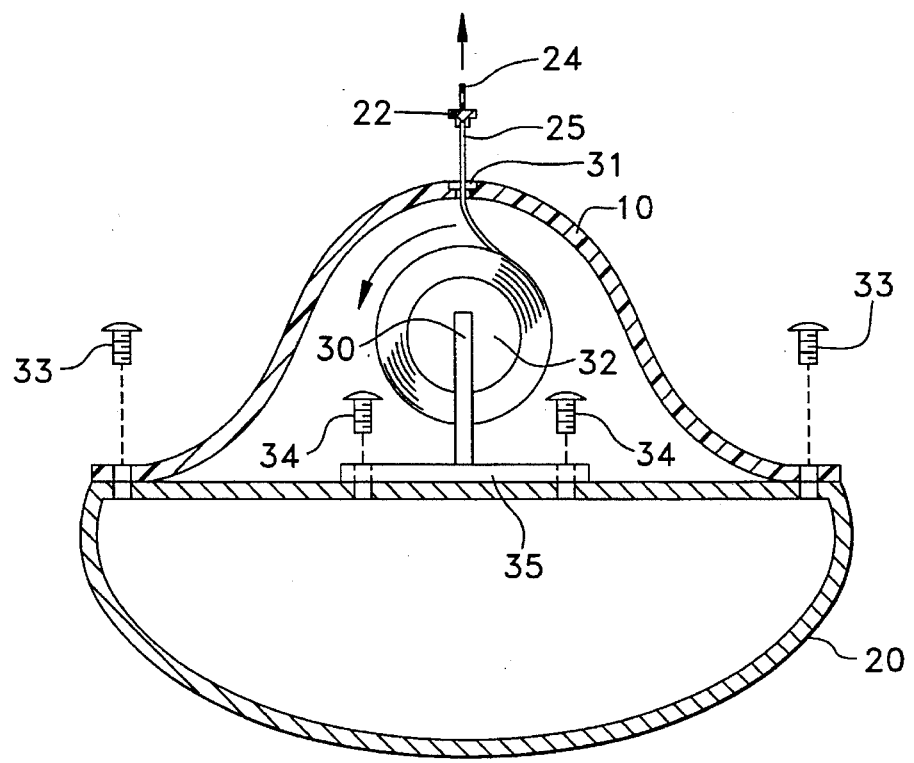
FIG. 4: is an enlarged, cross-sectional view, taken through line 4—4 of FIG. 1 of the windshield pillar of the motor vehicle cabin, illustrating the mounting of the preferred window shade device.
Figure 5:
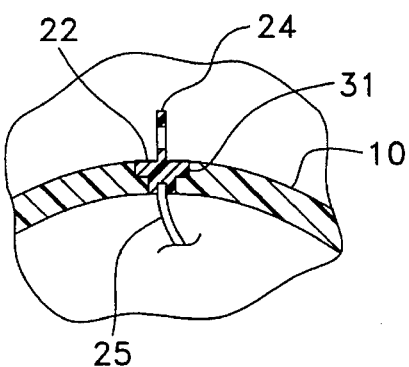
FIG. 5: is a partial, enlarged view of the substantially mating surfaces between the preferred rigid support and pillar interior panel of FIG. 4.
Figure 6:
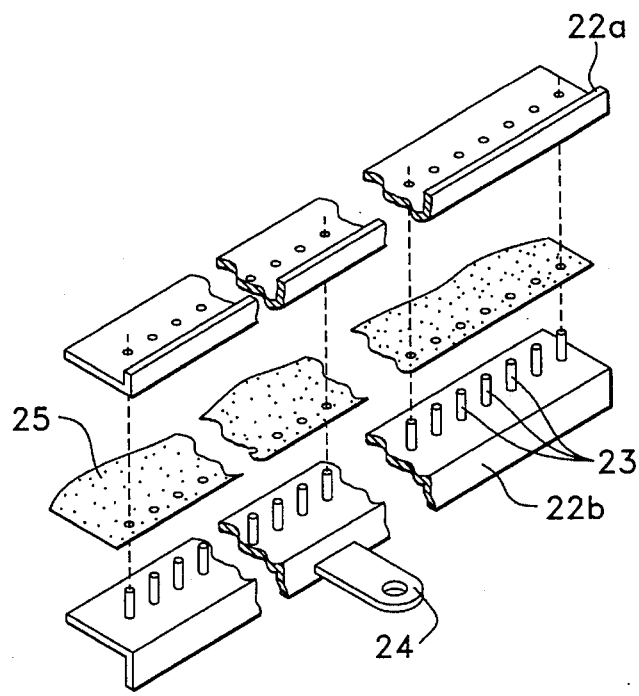
FIG. 6: is a partial, exploded perspective view of the free end of the preferred shade showing an optional means for adhering the rigid support to the shade.

With respect to the construction of the preferred window shade device 100, reference is made to FIGS. 4–6. As shown in the exploded view of FIG. 3, the preferred window shade device 100 includes a shade 25 having a fixed end mounted to a winding core 32. The winding core 32 can include a conventional spring mechanism tensioned in the wound up direction, and is preferably supported by support means 30 to the preferred mounting bracket 35.

In an important variant of this invention, the pillar interior panel 10, as opposed to a separate "aftermarket" polymeric cover, is equipped with a slotted opening 31, which receives the free end of the shade. When the pillar interior panel 10 is fastened to the windshield pillar 20 with panel fasteners 33 by the vehicle's manufacturer, the winding core 32 and mounting brackets 35 of the shade device 100 are preferably completely concealed from view. This can greatly improve the interior aesthetics of the cabin and hide the screen device's sharp edges.

As shown in FIG. 4, the wound shade 25 and its winding core 32 are supported to spin freely at both ends by a preferred support means 30, such as journal pins, etc. The support means 30 is shown to be attached to a pair of mounting brackets 35, which are desirably affixed to the metal windshield pillar 20 of the vehicle, so as to provide a firm and secure mounting connection. This is desirable to minimize the chance that the window shade device 100 will separate from its support during a collision. Although this design is preferred from a safety perspective, it is envisioned that the brackets can be used to support the window shade device on polymer or wooden surfaces as well.

This invention specifically envisions an "aftermarket" variant whereby the window shade device 100 is mounted to the pillar interior panel 10, instead of the windshield pillar 20, and is discreetly protected by an additional cover (not shown) made of plastic, wood, or metal, etc. This would permit the use of the current invention with used or existing automobiles that do not have shading mechanisms. Similarly, for the aftermarket industry, duplicate pillar interior panels can be molded, or existing interior panels can be trimmed or cut, so as to provide a slotted opening and/or sufficient interior space for older vehicles to be equipped with the window shade devices of this invention.

With respect to FIG. 5, some additional improvements provided by this invention can be explained. In an effort to further hide the presence of the window shade devices of this invention and to improve the aesthetics of the motor vehicle cabin 101, the rigid support 22, if used, can be designed to fit within the slotted opening 31. In the most preferred embodiment, the rigid support is designed to be substantially flush with the exterior surface of the pillar interior panel 10, and can be color-coded with the pillar interior panel 10 so as to effectively blend-in with that surface. In one preferred embodiment, the rigid support 22 contains a flange extending laterally therefrom which substantially matches the cavity of the slotted opening so as to provide a discreet flush-like appearance and a mechanical stop so as to prevent inadvertent loss of the free end of the shade 25 behind the pillar interior panel 10.

With respect to FIG. 6, there is shown a preferred construction of the rigid support 22. This rigid support 22 can be fabricated in two pieces, for example, rigid support halves 22a and 22b. As is typical in binding manuscripts, for example, the rigid support halves 22a and 22b and shade 25 can be fabricated with matching holes and guide pins 23, as shown. The guide pins 23 can be threaded through the corresponding holes in the shade 25 and into the matching holes in rigid support half 22a. The support halves 22a and 22b can be made of thermoplastic material so that the pins could be thermally or ultrasonically sealed after they have been threaded, and the two rigid support halves 22a and 22b have been joined together. The rigid support halves 22a and 22b could also be hinged along their exterior-facing surface to present a seamless appearance facing the cabin.

Figure 7:
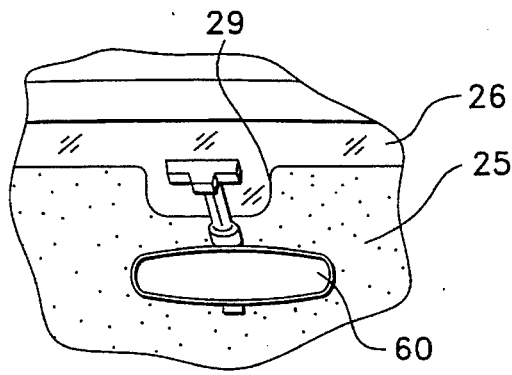
FIG. 7: is a partial view of an alternative shade configuration for a rearview mirror supported on a windshield.

With respect to FIG. 7, there is shown an alternative shade configuration having a mirror cut-out 29. In certain motor vehicles, it is customary to adhere the rearview mirror 60 at or near the windshield, for example, with adhesive. Since it may be desirable to provide as much coverage of the window or windshield as possible so as to further minimize exposure of the motor vehicle cabin to sunlight, the mirror cut-out can provide an accommodation for such rearview mirror configurations, to avoid unnecessarily distorting the shade during use.

Figure 8:
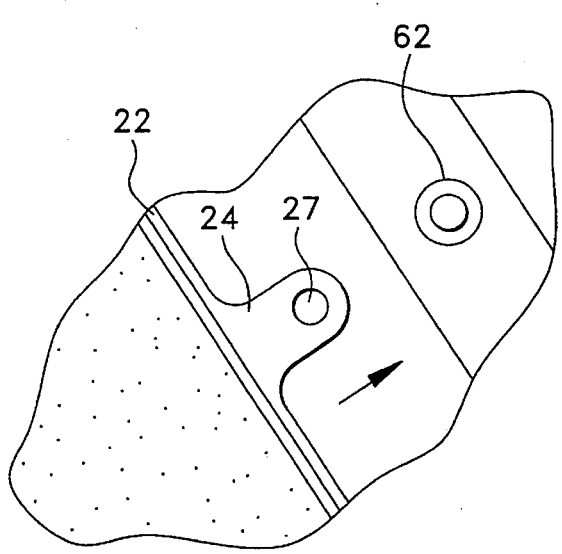
FIG. 8: is a partial enlarged view of the pull tab of the preferred shade prior to mounting on the preferred latch member.
Figure 9:
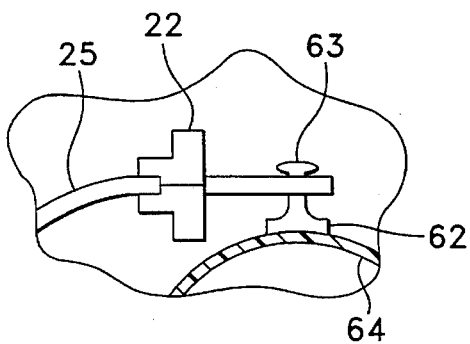
FIG. 9: is a partial side elevation, cross-sectional view of the preferred pull tab being mounted to the latch member to secure the shade in the unwound position.

With respect to FIGS. 8 and 9, the preferred latching system of this invention will be described. The preferred pull tab 24 comprises a strip of polymeric material, fabric, or leather having a pull tab aperture 27 therein. As the pull tab 24 is pulled across the windshield, either horizontally or vertically, and thus exposing the shade 25, the shade 25 can be fixed in an unwound position by inserting the latch button 63 of the latch member 62 through the aperture 27 of the pull tab 24. In the embodiment described, the latch member 62 is mounted to the opposite pillar interior panel 64 from the pillar interior panel that conceals the window shade device 100. It is understood, however, that if the window shade device is mounted behind the header interior panel, the latch member could be located on the dashboard or on a lower windshield surface. The preferred pull tab 24 can be mounted to the rigid support so that continued use will not create unintended damage to the shade 25. Although a mechanical latch member is shown, the shade 25 can be similarly held over the window by a hook-and-loop, snap, or button fastener, etc.

Figure 10:
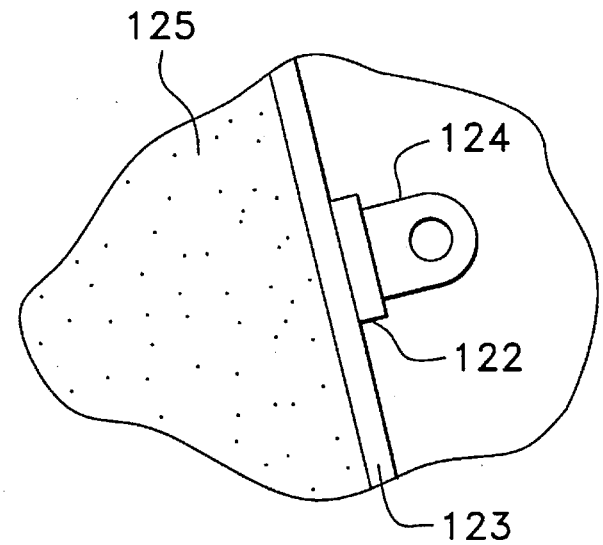
FIG. 10: is a partial, enlarged view of an alternative shade design having support tape and a stop joined to the pull tab.
Figure 11:
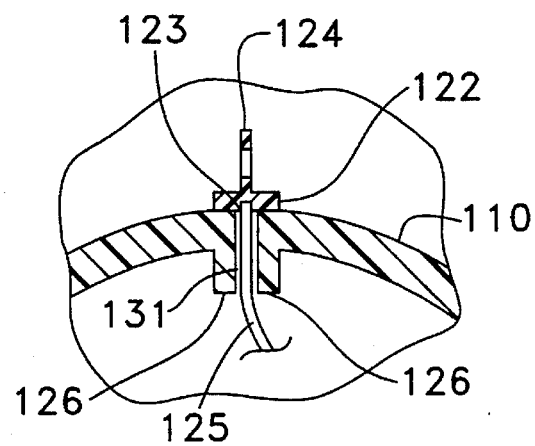
FIG. 11: is a partial, enlarged, side elevation, cross-sectional view of the shade design of FIG. 10 in the unwound position.

In an optional embodiment of this invention, shown in FIGS. 10 and 11, a guide 126 is provided within the pillar interior panel 110 to help thread the shade 125 through the slotted opening 131. The rigid support 22 can be eliminated in such an embodiment, or replaced with thin reinforcing tape 123 or a strip support, and the slotted opening 131 can therefore be made very thin so as to provide just enough clearance for easy unwinding of the shade 125. The guide 126 would provide easier threading of the shade during unwinding and greater assurance that the free end of the shade would not inadvertently slip behind the pillar interior panel 110. To further reduce unwanted retraction of the free end of the shade, a stop 122 can be provided which is larger than the measurement across the slotted opening 131. The stop 122 can be made with the pull tab 124 or can be a separate piece or pieces located along the free edge of the shade 125. The stop 122, like the rigid support 22, can be a polymer, can be color-matched, or made to be flush with the polymer cover surface.

The shade devices of this invention can readily be made to operate automatically through electric motor power. In such an embodiment, it would be desirable to have a linking mechanism disposed in the header and/or dashboard, and attached to a portion of the shade so that when the motor is activated, the shade is driven by the linkage into the unwound position. In order to promote a pleasing aesthetic appearance, this linkage or driving mechanism could be completely enclosed behind the header interior panel and/or the outer interior panels surrounding the windshield or window.

The shade 25 of this invention should be washable, durable, and inexpensive to manufacture. It should be a thin, somewhat rigid, sheet which is tinted or rendered opaque to limit the passage of sunlight. Such shades can be perforated with a plurality of regularly or irregularly spaced holes or shaped apertures. In one preferred embodiment, the exterior facing side of the shade 25 is made to be reflective, or has a lighter color or tone than the interior surface facing the motor vehicle cabin. Since the space necessary for accommodating the window shade device 100 between the pillar interior panel 10 and windshield pillar 20 should be as small as possible so as to avoid interfering with the driver's vision, or upsetting the aesthetic balance of the cabin, the shade can be manufactured from thin coated paper, or a strong thin sheet of polymeric materials, such as Mylar® film, nylon, PEEK, polyethylene, polyvinylchloride, polystyrene, and copolymers and mixtures thereof. These materials can be manufactured in thicknesses of less than about 1 mm and preferably less than 0.1 mm using conventional techniques.

From the foregoing, it can be realized that this invention provides window shade devices which are safer and more aesthetically pleasing than known prior art shades for motor vehicles. Although various embodiments have been illustrated, this is for the purpose of describing, and not limiting the invention. Various modifications, which will become apparent to one skilled in the art, are within the scope of this invention described in the attached claims.

What is claimed is:

1. A combination of a window shading device and a rigid window frame of a motor vehicle windshield, said windshield being supported in said rigid window frame, said combination further including a cover disposed over a portion of said rigid window frame to provide a pleasing aesthetic appearance to an interior of a motor vehicle, said combination further comprising:

a shade wound onto a winding core, said shade having one free end and one fixed end adhered to said winding core, said winding core being swivelly mounted between said rigid window frame and said cover, said cover providing a slotted opening for receiving said free end of said shade, said shade having a surface area which can substantially cover a selected surface area of said windshield.

2. The combination of claim 1, wherein said rigid window frame comprises a metal windshield pillar, and said core is swivelly mounted to said metal windshield pillar.

3. The combination of claim 2, wherein said cover comprises a plastic interior panel disposed over said pillar.

4. The combination of claim 3, wherein said slotted opening is disposed substantially vertically through said plastic interior panel.

5. The combination of claim 1, wherein said shade comprises a pair of vertical edges and a pair of horizontal edges, wherein said free end comprises a first of said vertical edges.

6. The combination of claim 5, wherein said shade comprises a rigid support adhered to said first vertical edge.

7. The combination of claim 6, wherein said rigid support comprises a configuration that is adapted to fit within said slotted opening when said shade is in a retracted position.

8. The combination of claim 7, wherein said rigid support is substantially flush with a surface of said cover when said shade is in said retracted position.

9. The combination of claim 6, wherein said rigid support comprises a color which substantially matches a color of said cover.

10. The combination of claim 6, wherein said rigid support comprises a flange portion disposed to substantially match a cavity in said cover.

11. The combination of claim 5, wherein said cover comprises a guide for feeding said shade through said slotted opening.

12. The combination of claim 5, wherein said slotted opening comprises a guide surface.

13. A combination of a window shading device and a rigid window frame having a header and a pair of windshield pillars, said windshield pillars having a pair of polymeric covers disposed over them to provide a pleasing aesthetic appearance, said combination further comprising:

a winding core and means supporting the winding core for permitting it to rotate, said winding core and said supporting means being discreetly hidden between a first of said windshield pillars and a first of said polymeric covers; and a shade having a pair of vertical edges and a pair of horizontal edges, at least a first of said vertical edges being fastened to said core so that the shade can be wound onto said core, a second of said vertical edges including pull tab means for permitting the shade to be unwound from the winding core upon pulling said pull tab means in a horizontal direction, said first polymeric cover providing a slotted opening for receiving said shade when said shade is unwound from said winding core.

14. The combination of claim 13, wherein said second vertical edge of said shade comprises a rigid support.

15. The combination of claim 14, wherein said rigid support is disposed to fit within said slotted opening.

16. The combination of claim 13, wherein one of said pair of polymeric covers comprises a plastic interior panel which covers said winding core.

17. The combination of claim 16, wherein said shade is discreetly hidden behind said plastic interior panel when in a wound position.

18. A window shading device in combination with a windshield of a motor vehicle and a rigid window frame for mounting said windshield therewithin, said window frame having a header and a pair of vertical pillars, said vertical pillars comprising plastic interior panels disposed over them to provide a pleasing aesthetic appearance, said combination further comprising: a winding core and means supporting the winding core for rotation of said core in first and second directions, and a shade having one end affixed to said winding core and a free end having a pull tab disposed thereon, at least a first of said plastic interior panels comprising a slotted opening therein for receiving said free end of said shade, said shade being discreetly hidden behind said first plastic interior panel when in a wound position, said pull tab being disposed so that pulling said pull tab removes said shade from behind said first plastic interior panel to substantially cover an interior surface portion of said windshield and to limit an amount of sunlight received into an interior of said motor vehicle.

* * * * *